UNITED STATES PATENT OFFICE.

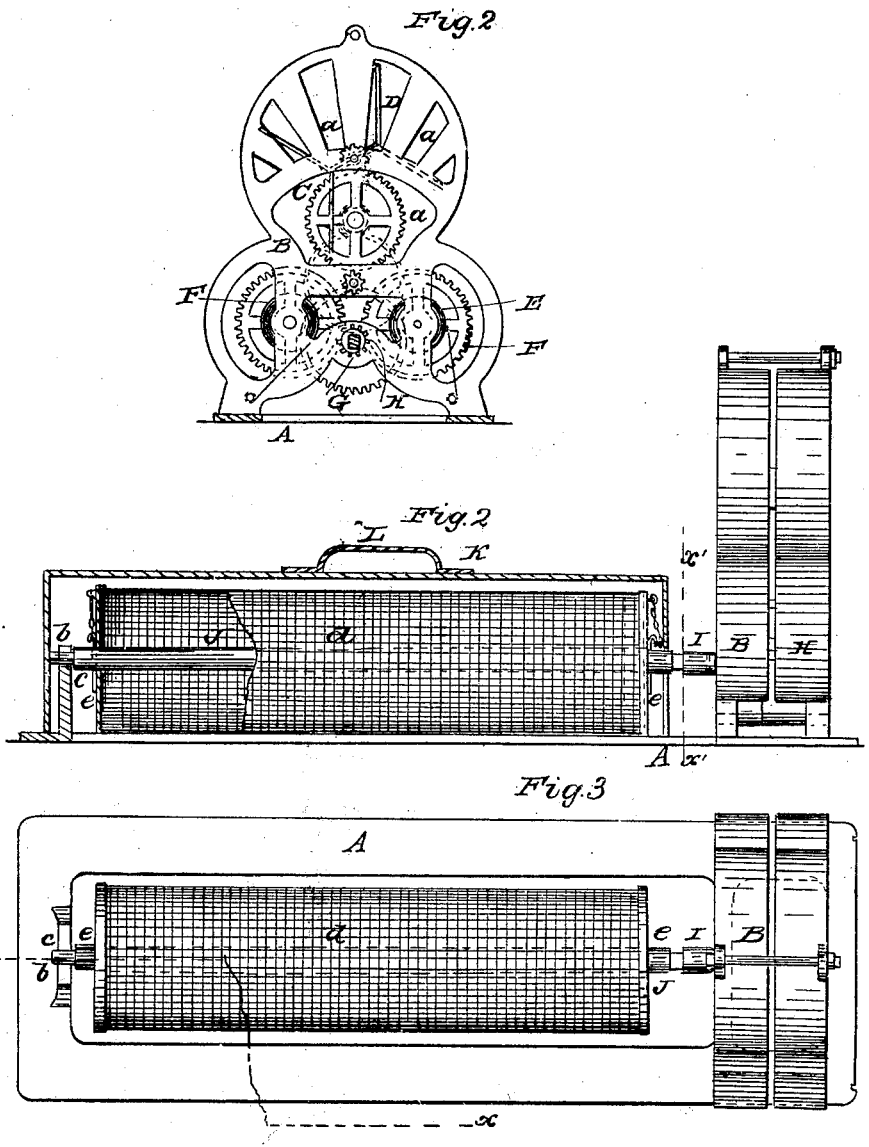

C. A. MILLS, OF BRISTOL, CONNECTICUT, ASSIGNOR TO THE UREKA MANUFACTURING COMPANY, OF BOSTON, MASSACHUSETTS.

COFFEE-ROASTER.

Specification forming part of Letters Patent No. 50,878, dated November 7, 1865.

*To all whom it may concern:*

Be it known that I, C. A. MILLS, of Bristol, in the county of Hartford and State of Connecticut, have invented a new and Improved Coffee-Roaster; and I do hereby declare that the following is a full, clear, and exact description thereof, which will enable those skilled in the art to make and use the same, reference being had to the accompanying drawings, forming part of this specification, in which—

Figure 1 is a front view of my invention, partly in section, as indicated by the line $x\,x$, Fig. 3; Fig. 2, a transverse vertical section of the same, taken in the line $x'\,x'$, Fig. 1; Fig. 3, a plan or top view of the same, with the cover of the coffee-receptacle removed.

Similar letters of reference indicate corresponding parts.

This invention relates to certain improvements on a coffee-roaster for which Letters Patent were granted to me bearing date April 28, 1863.

The original invention consisted of a rotating sheet-metal coffee-receptacle hung on a shaft or pivots horizontally, and operated by means of a clock-movement provided with a single spring.

The present improvements consist in substituting a wire-cloth coffee-receptacle for the sheet metal one previously used, whereby the coffee is screened while being roasted and the husk and other substances which give the coffee a disagreeable bitter taste removed or separated from the coffee.

Another improvement consists in using a detachable lid or cover with the receptacle above mentioned, whereby the heat is retained around said receptacle and also the aroma of the coffee, while previous to the roasting operation the lid or cover is removed, in order to admit of all moisture being expelled, so that the coffee may be roasted in a dry state.

Another improvement consists in applying two driving-springs to the clock-movement, whereby the device may be wound up during the time the same is in operation and without stopping the rotation of the coffee-receptacle.

Another improvement consists in a novel manner of applying the coffee-receptacle to the device, whereby it may be readily detached for the purpose of being filled and emptied and readily applied and connected for use.

A represents a metallic frame, of skeleton form and of any suitable dimensions, having secured to it at one end a metal shell or case, B, in which the clock-movement C is placed. This shell or case is cast or otherwise constructed with openings $a$, to admit of a free circulation of air through it, in order that the driving-mechanism may be kept in a cool state when the device is at work on a range or stove, the fan D, which is connected with the clock-movement, serving to cool said parts, and also serving as a fly or equalizer of the movement of the working parts. This clock-movement is operated by two springs, E E, each of which is connected with a toothed wheel, F, in the usual way, said wheels gearing into a pinion, G, on a shaft, H, from which the coffee-receptacle is rotated. By this arrangement it will be seen that the device may be wound up at any time without stopping, one spring keeping the device in operation while the other is being wound up. No delay, therefore, will be occasioned in winding up the device when in operation.

The shaft H is provided at one end with a socket, I, having a rectangular opening or interior to receive one end of the shaft J of the coffee-receptacle. The shaft J, at its upper end, has its journal $b$ resting in an open bearing, $c$. By this arrangement it will be seen that the coffee-receptacle may be readily detached from and applied to the device.

The coffee-receptacle is composed of wire-cloth $d$, bent in the form of a hollow cylinder, and having ends, composed of circular heads or disks $e$ of sheet metal, fitted on shaft J, one of which is arranged like the lid of a box, so that it may be taken off and fitted on one end of the receptacle to admit of the latter being filled and emptied.

K is a lid or cover, constructed of tin and provided with a handle, L, to admit of its being readily placed over and removed from the coffee-receptacle. This lid or cover retains the heat, causing the coffee to be roasted over a moderately-heated top-plate of a range or stove, and at the same time it prevents the aroma of the coffee from escaping. It may be raised from time to time in order to see how the roasting process is progressing, and to ensure the coffee being roasted to the required degree.

The coffee-receptacle should rotate with a moderate speed, and it will of course be seen that the coffee is screened while being roasted, the skin of the berry being thorougly scoured off, and all impurities sifted out, so that the beverage made from it will be free from the sediment and bitter taste which so often renders coffee disagreeable.

Having thus described my invention, I claim as new and desire to secure by Letters Patent—

1. A rotating coffee-receptacle in which coffee is roasted constructed of a wire-cloth so as to form a screen or sieve when said receptacle is rotated or operated through the medium of a clock-movement, substantially as shown and described.

2. In combination with the coffee-receptacle, constructed as set forth, the lid or cover K, arranged to fit over the receptacle, as described.

3. The application of two springs, E E, to the clock-movement when the latter is used in connection with or to drive a rotating coffee-receptacle, substantially as and for the purpose specified.

4. The applying of the coffee-receptacle to the device by having a socket, I, at one end of the shaft H of the clock-movement, to receive one end of the shaft J of the coffee-receptacle, while the journal at the opposite end of said shaft is fitted in an open bearing, c, substantially as described.

The above specification of my invention signed by me this 4th day of August, 1865.

C. A. MILLS.

Witnesses:
M. M. LIVINGSTON,
C. L. TOPLIFF.